United States Patent [19]
Schroeder

[11] Patent Number: 5,920,328
[45] Date of Patent: Jul. 6, 1999

[54] METHOD FOR CONTROLLING POSITION OF A RECORDING PEN

[76] Inventor: Leo Schroeder, 3420 Franklin La., Billings, Mont. 59101

[21] Appl. No.: 08/879,989

[22] Filed: Jun. 21, 1997

[51] Int. Cl.$^6$ .............................. G01D 9/00; B41J 23/00
[52] U.S. Cl. ............................................. 346/31; 347/37
[58] Field of Search ......................... 346/31, 32; 347/37

[56] References Cited

U.S. PATENT DOCUMENTS

| | | | |
|---|---|---|---|
| 5,329,303 | 7/1994 | Gill | 346/140.1 |
| 5,567,063 | 10/1996 | Chiu | 347/37 |

FOREIGN PATENT DOCUMENTS

| | | | |
|---|---|---|---|
| 450509 | 8/1947 | Canada | 346/32 |
| 501560 | 4/1954 | Canada | 346/32 |
| 1 281 160 | 10/1968 | Germany | 346/32 |

*Primary Examiner*—N. Le
*Assistant Examiner*—Thien Tran

[57] ABSTRACT

A simple and inexpensive device to record one or more phenomena, employing the transmission and receiving of light as a method of sensing pen position. A pen holder (13) is mounted on a pen block (12), as is a light receiver element (15), and pen block (12) is mounted on a threaded pen rod (11), rod (11) being rotated to move the pen block (12) along the length of the pen rod (11). As pen block (12) moves, light receiver element (15) intercepts more or less light flux from a fixed light source (16), producing a voltage in receiver (15) which is processed to a suitable level by an op amp (40), this voltage being called the Lov. Simultaneously, a voltage directly related to the phenomenon being recorded, as generated by a sensor (44), is processed by an op amp (41) to a desired voltage level called the Pov: the Lov and Pov are now compared in a comparator circuit (42) whose output is buffered by an op amp (43), the output of which is called the Mcv. This MCV will be either positive or negative or zero, and is used to control a motor (20) which turns pen rod (11), moving pen block (12), with attatched receiver element (15) and pen holder (13), with attatched pen (14), in a direction such that the Lov becomes equal to the Pov, at which point pen rod (11) stops, with the pen (14) having traced a record of the phenomena on scribed paper moving beneath the pen (14). As time advances, the entire comparation process repeats continuously, and pen (14) is made to follow any change in input from phenomenon sensor (44), leaving a record of any changes on paper which is pulled over a platen beneath pen (14).

2 Claims, 2 Drawing Sheets

180
METHOD FOR CONTROLLING POSITION OF A RECORDING PEN

BACKGROUND—FIELD OF INVENTION

This invention relates to the positioning of recording pens, as used in recorders and similar mechanisms.

BACKGROUND—DESCRIPTION OF PRIOR ART

Chart recorders are in widespread use in many areas of endeavor, where they may be used to record almost any phenomenon which may be translated into movement of a pen. Phenomena recorded may include temperature, wind speed and direction, sunlight hours, supply demands of utility companies, vehicle and engine speeds, the opening and closing of doors, indeed almost any event of interest.

The simplest of these chart recorders is one used to record temperature, and consists of a coiled bimetallic element, fixed at one end and with a marking stylus affixed at the other end. As the bimetallic element coils and uncoils in response to changing temperature, the stylus, contacting some form of chart which is moved beneath the stylus, leaves a record of temperature. This apparatus suffers from some inaccuracy, and will not record temperatures which occur at a remote location. A somewhat similar instrument has the stylus affixed to a sealed chamber, and is used to record barometric pressure.

Other recording devices use a sensing chamber filled with a material which expands and contracts with temperature. This sensing chamber is connected, usually by a small diameter tube, to a coiled chamber. Temperature changes cause the coiled chamber to coil or uncoil; the pen is connected to this coiled chamber, and leaves a printed record of temperature. Such devices are limited by the length of the connecting tube, which cannot be very long, (usually not over 3 ft), in the reading of a remote temperature. Also, the connecting tube is rather inflexible, and subject to damage, even rupture. Replacement of the sensor assembly is expensive, and response of this sensor assembly to changes of temperature is rather slow.

The above recorder devices, and others, operate in a mechanical way. Electric (or electronic) recorders require a method to sense pen position, unneeded in the above mechanical types.

U.S. Pat. No. 5,329,303, issued Jul. 12, 1994, to Gill, shows a chart recorder which uses a slider contacting a resistance wire to sense pen position: such arrangement is prone to wear of the resistance wire, as well as the slider, with ensuing noisy (electrically speaking) and erratic operation. This patent employs a system whereby the motor driving the pen is stalled when a high or low limit of pen position is found. A current sensor then shuts off the motor for a short period of time, making the recorder inoperative meanwhile, another disadvantage. Also, current draw of the stalled motor would reduce battery life, and the mechanism moving the recording pen is quite complex.

The resistance wire arrangement of sensing pen position actually amounts to a wire-wound potentiometer: a carbon potentiometer could be substituted, but carbon pots are notorious for rapid wear with ensuing noisy and erratic operation.

More recent recorders employ digital circuitry, at times involving stepper motors, digital memory, and so on. Cost becomes a big factor in these devices, and cost of repairs also.

Applicant's proposed invention would overcome many of the above mentioned shortcomings, by use of a simple and novel method of pen positioning, and would result in a low cost, rugged, durable, and portable unit to simultaneously record one or more phenomena, which phenomena could be of different types (as temperature and wind speed, for instance), and from a remote site.

OBJECTS AND ADVANTAGES

Accordingly, several objects and advantages of my chart recorder are:

(a) the use of a unique method of sensing pen position, which method is reliable, smooth, simple, accurate, and not prone to wear or erratic operation.

(b) ability to record phenomena occuring at a remote site, using a small and flexible input cable, which may be many feet long.

(c) ability to record simultaneously one or more phenomena, even phenomena of a different nature (d) low cost, with few moving parts subject to wear or break-down problems.

(e) almost instant reaction to changing input.

(f) excellent portability due to battery operation.

(g) use of readily available, durable and reliable, non-critical and low cost parts, to keep any repair costs low (h) use of parts whose life expectancy will tend to be long.

Still further objects and advantages will become apparent from a consideration of the drawings and ensuing description.

DRAWING FIGURES

REFERENCE NUMERALS IN DRAWINGS

FIG. 1 includes

| 10 | base | 11 | penrod |
| 12 | pen block | 13 | pen holder |
| 14 | pen | 15 | light receiver element |
| 16 | light source | 17L | left pen rod support |
| 17R | right pen rod support | 18 | pen rod pulley |
| 19 | belt | 20 | pen drive motor |
| 21L | left limit switch | 21R | right limit switch |
| 22 | guide member | 23 | bolts |

FIG. 2 includes

| 15 | light receiver element | 16 | light source |
| 20 | pen drive motor | 21L | left limit switch |
| 21R | right limit switch | 40 | light operational amplifier |
| 41 | sensor operational amplifier | 42 | comparing operational amplifier |
| 43 | buffer operational amplifier | 44 | sensor |
| 51 | spdt relay | 52 | spdt relay |
| 53 | switching diode | 54 | switching diode |
| 55 | snubbing diode | 56 | snubbing diode |
| 60 | battery pack | | |

SUMMARY

In accordance with one embodiment of the present invention, a low-cost chart recorder using simple and inexpensive parts, employing a unique method for sensing pen position, responding almost instantly to any change in phenomena being recorded, able to record one or more phenomena from a remote distance, and which is very portable.

Figure 1:
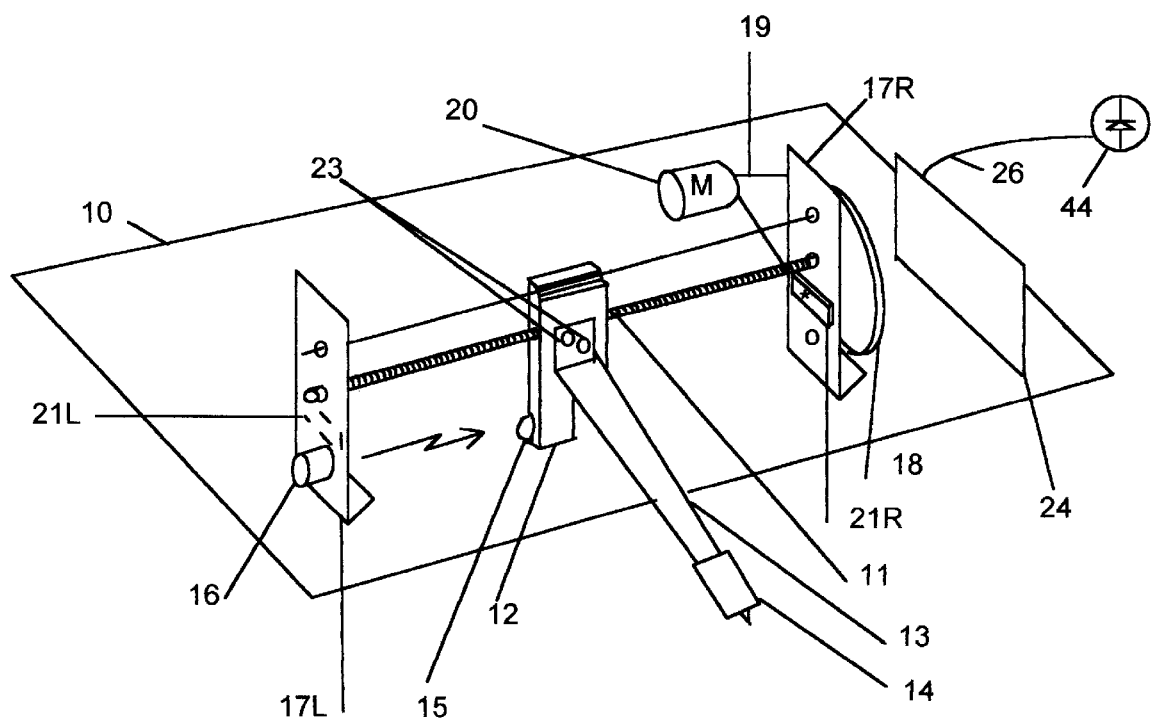
FIG. 1 shows a perspective view of a pen drive assembly
Figure 2:
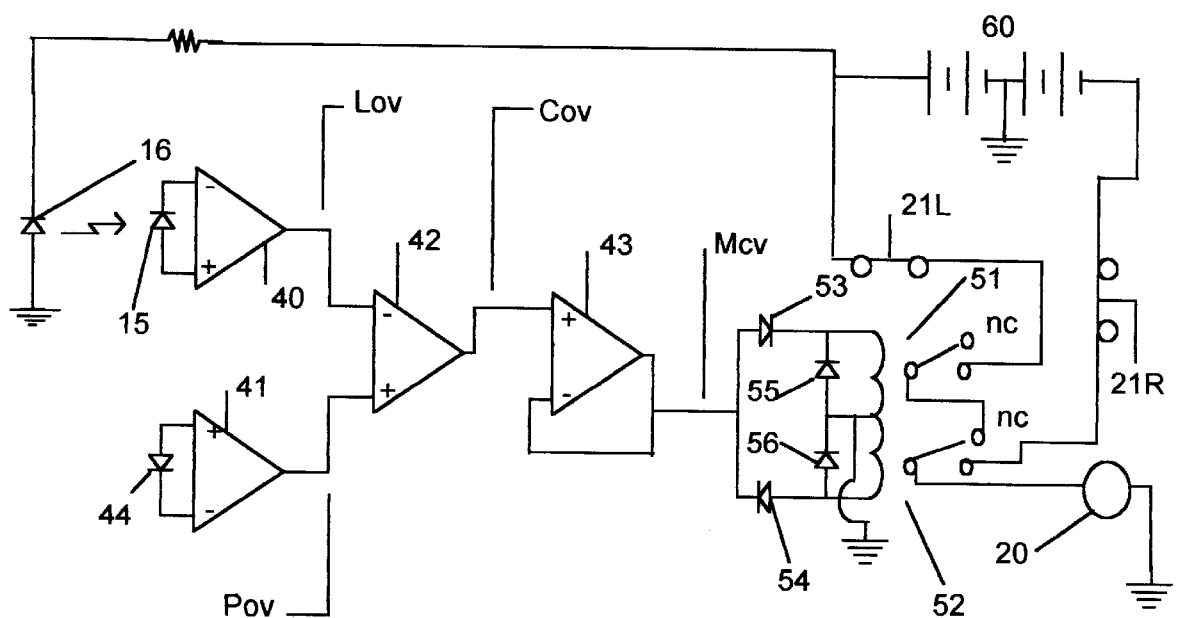
FIG. 2 shows a simplified schematic of the electronic circuitry

DESCRIPTION OF THE PREFERRED EMBODIMENTS—FIGS. 1 and 2

FIG. 1 shows a perspective view of the pen drive assembly of the recorder. A pen block 12 is provided with a transverse threaded hole through it's middle, through which hole a threaded pen rod 11 is screwed. To permit a pen 14 to record on a chart 10 mm wide, this pen rod is about 18 mm long. Pen block 12 has on it's lower portion a recess to permit mounting of a light receiver element 15, and drilled holes, front to rear, to accept two bolts 23, which are used to mount a pen holder 13. On the upper transverse surface of pen block 12 a channel is formed to accept a guide member 22. Pen rod 11 is supported at its left end by a left support 17L, which has 3 holes drilled through it's vertical portion. The bottom hole serves as a mounting for a light source 16, the middle hole accepts and supports the left end of pen rod 11, and the top hole accepts and supports the left end of guide member 22. Pen rod 11 is supported at its right end by a right support 17R, which is identical to support 17L. The bottom hole of 17R is not used: the middle hole accepts and supports the right end of pen rod 11, and the top hole accepts and supports the right end of guide member 22. Each support 17L and 17R is equipped with a bottom flange permitting it to be bolted to base 10 (bolts not shown). Also mounted to base 10 is a pen drive motor 20, which is furnished with a pulley (not shown) to accept a belt 19. A pen rod pulley 18 which accepts belt 19 is firmly attatched to the right end of pen rod 11, permitting pen rod 11 to be rotated around its longitudinal axis by pen drive motor 20 via belt 19. Limit switches 21L and 21R are mounted on each support 17L and 17R, respectively.

FIG. 2 shows a simplified schematic of the electronic circuitry, including limit switches 17L and 17R, and motor 20 as in FIG. 1. Light source 16 produces light which is received by light receiver element 15. The voltage generated by light receiver 15 is processed by op amp 40, and this processed voltage output is fed to comparator op amp 42. The phenomenon to be recorded is sensed by a sensor 44: the voltage thus produced is processed by op amp 41, and the processed output voltage is fed also to comparator op amp 42. The output of comparator op amp 42 is sent to op amp 43, and the output of op amp 43 is fed to two diodes 53 and 54. Each diode passes any output to it's respective relay, 51 or 52. Snubbing diodes 55 and 56 are shown.

OPERATION OF INVENTION

Preferred Embodiment

FIG. 1 shows a pen 14 mounted to a pen holder 13, and holder 13 mounted to a pen block 12. Pen block 12 is equipped with a threaded transverse hole which accepts a threaded pen rod pulley 18, which pen rod has a pen rod pulley 18 firmly affixed to it's right end and which pen rod is supported at it's left end by a support member 17L and at it's right end by a support member 17R, both supports being securely bolted to a base 10. Pulley 18 is driven via a belt 19 from a pulley (not shown) on a pen drive motor 20, also mounted to base 10, and as motor 20 turns clockwise or counterclockwise, pen block 12 moves along the length of pen rod 11; in the present embodiment this pen rod is about 18 mm long. Pen block 12 is furnished with a transverse channel along it's top, which channel accepts a guide member 22. Guide member 22 is firmly affixed at either end to supports 17L and 17R, and impinges the channel atop pen block 12, preventing pen block 12 from rotating as pen rod 11 turns. Limit switches 21L and 21R are mounted on supports 17L and 17R respectively, in such position that pen block 12 will trigger a limit switch at either end of it's travel, which travel is thereby limited in the present embodiment to 10 mm.

Pen block 12 has mounted on it a pen holder 13, and also a light receiver element 15, which element receives light from a fixed light source 16, fixedly mounted to support member 17L, with its light output being directed along the longitudinal axis of pen rod 11, and aimed specifically at receiver element 15. By preventing pen block 12 from rotating, guide member 22 maintains alignment of light receiver element 15 and light source 16, and also maintains proper pressure of a pen 14, mounted on pen holder 13, upon the recording medium.

As receiver element 15 approaches or moves away from light source 16, more or less light flux is intercepted by receiver element 15, which produces more or less voltage output from receiver element 15. Element 15 is connected in "short-circuit" mode (that is, with little or no voltage applied across it) to reduce temperature-induced leakage effects. The voltage generated by element 15 in response to light flux impinging upon it is processed by op amp 40, FIG. 2, to an output voltage hereinafter called the light output voltage, (Lov). In the present embodiment, this voltage ranges from about 10 volts when the light elements 15 and 16 are nearest to each other, to about 0.5 volts, when they are farthest apart. As shown in FIG. 2, the phenomenon being recorded is sensed electronically by a sensor 44, and the resulting voltage is processed by op amp 41 to a range approximating the range of Lov. After being so processed, the voltage is hereinafter called the phenomenon output voltage, (Pov).

The Pov and Lov voltages are now compared in op amp 42, operated as a comparator, the output of which will be either positive, or negative, or zero, depending on the potentials of the input voltages Pov and Lov. The comparator output voltage, hereinafter called Cov, is sent to op amp 43, used for buffering and hysteresis: the output of op amp 43 is hereinafter called the motor control voltage, (Mcv).

This Mcv is now fed to the junction of 2 diodes 53 and 54, connected so that only one can conduct at a time, depending on the polarity of Mcv. Each diode 53 and 54, if conducting, will activate the corresponding relay 51 or 52, thereby applying power to pen motor 20, producing clockwise or counterclockwise rotation, and driving pen rod 11 of FIG. 1 correspondingly: this rotation of pen rod 11 produces movement of pen block 12 of FIG. 1 in a lateral direction, left or right, such that the Lov will become equal to the Pov, at which point pen rod 11 will cease rotation, (since now Lov=Pov and so Cov and Mcv=0). Pen block 12 will stop, with the pen 14 of FIG. 1 having traced a record of the sensor input as the input changes.

Left limit switch 21L is triggered by the pen block at the left limit position, and inhibits further motor drive in a direction producing leftward movement of pen block 12 at that point, although the motor is still able to move the pen block to the right if conditions warrant: right limit switch operates similarly at the right limit position, and does not inhibit any warranted movement to the left.

Diodes 55 and 56, connected across the coils of relay 51 and 52, are clamping diodes, used to prevent inductive surges from the relay coils from damaging other circuit components.

The recorder is powered by two twelve volt batteries, as shown in FIG. 2, connected to deliver plus 12 volts and negative 12 volts, with a common or ground connection provided. All op amps have their positive power input pins connected to plus 12 volts, and their negative power input pins connected to negative 12 volts, the circuit being completed to ground through various biasing resistors (not shown) which establish the operating parameters for the op amps.

Where simultaneous recording of a second phenomenon is desired, this is accomplished by adding another pen drive assembly to base 10: this second assembly is identical to the assembly detailed in FIG. 1 except that pen rod pulley 18 is now placed on the left end of pen rod 11 and pen drive motor 20 is mounted appropriately to drive pulley 18: pen block 12, with attatched receiver element 15, faces toward the right, toward light source 16 which is mounted in the bottom hole of support 17R. This end-for-end reversing of parts (as compared to the first assembly) permits the second assembly to be placed in close proximity to the first, and allows the respective pens to trace in close proximity to each other without interference. Also, pen holder 13 of the second assembly has a greater length, and is angled as required to extend over the top of the first assembly, so that the second pen can write in front of and in close proximity to the pen of the first assembly: to this end, the pen of the second assembly has a longer tip to keep it clear of the pen of the first assembly.

The second pen drive assembly is supplied with it's own electronic circuit, identical to that shown in FIG. 2, and operation of the second pen drive assembly is identical to that of the first pen drive assembly detailed above.

Applicant prefers to record the phenomena on a 10.5 mm wide roll of paper, suitably scribed with calibrated lines representing time and the phenomena extending down the length of the paper, which is pulled over a platen beneath the pen by being sandwiched between a motor-driven rubber paper-drive roller and a pressor bar, in conventional manner which need not be further described.

CONCLUSION

Thus it may be seen that the proposed invention provides a simple, inexpensive, and reliable chart recorder, able to record 1 or more events from remote points.

While the above description contains many specificities, these should not be construed as limitations on the scope of the invention, but rather as an exemplification of one preferred embodiment thereof. Many other variations are possible, as for instance a. While applicant prefers to use infrared LEDs as light receiver and source, visible-light LEDs could be used, or the source could consist of an ordinary light bulb, or laser, and the receiver could consist of a photoresistor or solar cell or phototransistor or other device.

b. The pen block, pen holder, and pen could utilize many different materials, shapes and forms, with the light source and receiver mounted either above or below the pen rod, or to the front or rear of the pen rod.

c. The pen rod could be replaced with another mechanism, as for instance a pulley-and-wire system could be used to move the pen block, which could slide left or right on a smooth rod or other support.

d. The pen rod could be rotated various means, and gears or a friction drive could be used, instead of a belt-drive as in the preferred embodiment.

e. A host of variations are possible in the electronic circuitry. A quad op amp could be used, or discrete components could be used instead of op amps; other operating parameters could be chosen for the op amps; op amp 43, used for buffering and hysteresis, might be eliminated altogether; the diodes and relays used for motor control might be replaced by SCRs, LASCRs, zener diodes, etc.

f. Instead of batteries, any well-regulated AC operated power supply could be used, alone or in conjunction with rechargeable batteries, or a solar cell device could be used, etc.

g. The paper and paper drive mechanism are subject to many possible variations; the paper may be of other widths and lengths, and does not necessarily need to be in roll form; the paper could be in the form of a circle, to produce a circular chart; the paper could be of a pressure-sensitive type, with use of a proper stylus, and the paper could be of the thermal type, with use of proper stylus apparatus. A self-inking roller could be used to scribe time and phenomena grids on the paper as the recorder was in operation, eliminating the need for prescribed paper. The paper drive mechanism could take many forms, also, and be powered by other than a motor.

Other permutations may readily occur to one skilled in the art.

I claim:

1. A chart recorder comprising sensor input and pen positioning means, said pen positioning means comprising the transmission of a predetermined intensity of light flux in a predetermined directional path from a stable, fixed light source, which said light flux is received by a light receiver element, said light receiver element oriented toward the fixed light source, and said light receiver element mounted fixedly together with a recording pen, the pen/element pair positioned by movement means along at least a portion of the predetermined light flux path, the receiver element producing a discrete voltage, derived from light flux reception, at each distinct position of said pen/element pair along said predetermined light flux path, which said discrete voltage is adjusted by a voltage processing means to fall within a predetermined range, and then compared with a voltage produced by a sensor which is exposed to a chosen phenomenon, which sensor voltage is adjusted by a voltage processing means to fall within a range which is substantially the same as the range of voltage produced from light flux reception, the comparison producing a voltage which is either positive, negative, or zero, and which voltage, now buffered by an op amp, is known as a motor control voltage, which said motor control voltage is applied to said movement means, whereby said movement means is made to move the pen/element pair to a position where the motor control voltage is zero whereby the pen is made to follow substantially all variations in adjusted sensor output voltage produced as a result of sensor input.

2. A method for making a recording pen reproduce the voltage variations generated by a particular sensor when said particular sensor is exposed to a specific phenomenon, comprising the steps of:

a. providing a light source which is fixed in position, which light source emits a stable light flux of chosen intensity along a predetermined directional path b. providing a light receiver element, and providing a recording pen, and providing a pen block upon which said light receiver element and said recording pen are each fastened fixedly c. providing a movement means by which movement means said pen block is moved along at least a portion of the path of light transmission from said light source, with said light receiver element oriented toward said light source d. providing a voltage processor which adjusts the potential of voltage, produced as said light receiver element receives light flux, to fall within a predetermined range e. providing a sensor means which produces an electrical voltage when exposed to a specific phenomenon being recorded, and providing a voltage processor which adjusts this sensor electrical voltage to fall within the same predetermined voltage range as that voltage range produced from the receiving of light flux f. providing a comparator which, in response to the inputting of the adjusted light flux voltage and the adjusted sensor voltage, produces a comparator output voltage which is either positive, negative, or zero g. providing a buffering means, which inputs said comparator output voltage, and outputs a voltage hereinafter known as a control voltage, which said control voltage is applied to said movement means, forcing said movement means to move said pen block to a position at which said control voltage is zero whereby said recording pen is made to follow substantially all variations in sensor voltage produced in response to variations in said specific phenomenon being recorded.

* * * * *